US 12,358,934 B2

(12) United States Patent
Zhuang et al.

(10) Patent No.: US 12,358,934 B2
(45) Date of Patent: Jul. 15, 2025

(54) PHOSPHORUS-CONTAINING COMPOUND AND PREPARATION METHOD AND USE THEREOF

(71) Applicants: CHINA PETROLEUM & CHEMICAL CORPORATION, Beijing (CN); RESEARCH INSTITUTE OF PETROLEUM PROCESSING, SINOPEC, Beijing (CN)

(72) Inventors: Minyang Zhuang, Beijing (CN); Hui Zheng, Beijing (CN); Xinyang Liu, Beijing (CN); Wei Liu, Beijing (CN); Yifeng He, Beijing (CN)

(73) Assignees: CHINA PETROLEUM & CHEMICAL CORPORATION, Beijing (CN); RESEARCH INSTITUTE OF PETROLEUM PROCESSING, SINOPEC, Beijing (CN)

( * ) Notice: Subject to any disclaimer, the term of this patent is extended or adjusted under 35 U.S.C. 154(b) by 409 days.

(21) Appl. No.: 17/755,076

(22) PCT Filed: Oct. 21, 2020

(86) PCT No.: PCT/CN2020/122396
§ 371 (c)(1),
(2) Date: Apr. 20, 2022

(87) PCT Pub. No.: WO2021/078137
PCT Pub. Date: Apr. 29, 2021

(65) Prior Publication Data
US 2022/0289771 A1    Sep. 15, 2022

(30) Foreign Application Priority Data
Oct. 21, 2019   (CN) .......................... 201910997452.4

(51) Int. Cl.
C07F 9/11       (2006.01)
C07F 9/09       (2006.01)
C10M 137/04     (2006.01)

(52) U.S. Cl.
CPC ............... C07F 9/11 (2013.01); C07F 9/094 (2013.01); C10M 137/04 (2013.01)

(58) Field of Classification Search
CPC .. C07F 9/091; C07F 9/094; C07F 9/11; C07F 9/12; C10M 137/04; C10M 2203/1006; C10M 2205/0285; C10M 2223/04
See application file for complete search history.

(56) References Cited

U.S. PATENT DOCUMENTS

| 4,333,841 A | 6/1982 | Schmidt et al. |
| 2014/0016290 A1 | 1/2014 | Lee et al. |

FOREIGN PATENT DOCUMENTS

| CN | 1228803 A | 9/1999 |
| CN | 102408939 B | 7/2013 |
| CN | 105132104 A | 12/2015 |
| CN | 103642557 B | 2/2016 |
| CN | 106046047 A | 10/2016 |
| WO | 2010096291 A1 | 8/2010 |
| WO | 2012161951 A1 | 11/2012 |

OTHER PUBLICATIONS

Depax et al. "Nucleophilic addition of primary and secondary amines to the ethylenic bond of phosphomono- and bis(enolpyruvate). Synthesis of macrocyclic compounds of phosphoaminoethanol" Sep. 2006. Phosphorus, Sulfur, and Silicon. vol. 78 pp. 257-264. (Year: 2006).*
Shaozhou Zhu et al., "Dual substrate-controlled kinase activity leads to polyphosphorylated lasso peptides", FEBS Letters, vol. 19, No. 590, Sep. 18, 2016, pp. 3323-3334.
Despax, Corine et al.; "Additions Nucleophiles d'amines Primaires et Secondaires sur la. Liaison Ethylenique des Phosphomono-et di-(Enolpyruvate). Essais de Synthese de Composes Macrocycliques de Phosphoaminoethanol"; Phosphorus, Sulfur and Silicon and the Related Elements, vol. 78; Jan. 1, 1993; ISSN: 1042-6507; pp. 257-264.
Zhang, Jian-Chen et al. "A Novel Synthesis of O-Phosphorylated Amino Acids Containing Hydroxy Side Chain Group"; Chinese Journal of Organic Chemistry; Year: 2004; vol. 24, No. 6; pp. 650-653.
Xue, Chu-Biao et al. "Studies on Phosphoserine and Phosphothreonine Derivatives: N-Diisopropyloxyphosphoryl-serine and -threonine in Alcoholic Media"; Tetrahedron Letters; Year: 1988; vol. 29, No. 10; pp. 1145-1148.

(Continued)

Primary Examiner — Latosha Hines
(74) Attorney, Agent, or Firm — NKL Law; Allen Xue

(57) ABSTRACT

A phosphorus-containing compound is represented by the formula (I):

$$\begin{array}{c} R_0 \\ \phantom{R_0}\diagdown \\ \phantom{R_0}N \\ \phantom{R_0}\diagup \\ R_0 \end{array} \!\!\!\! \left( R \!-\! \underset{\underset{R_0}{|}}{\overset{\overset{A}{|}}{C}} \!-\! \underset{}{\overset{\overset{O}{\|}}{N}} \right)_{\!\!n} \!\!\!\! R \!-\! \underset{}{\overset{\overset{A}{|}}{C}} \!-\! \underset{}{\overset{\overset{O}{\|}}{C}} \!-\! OR_b. \quad (I)$$

The phosphorus-containing compound has excellent biodegradability and oxidation resistance, and is suitable for promoting biodegradation of lubricating oil product.

13 Claims, No Drawings

(56) References Cited

OTHER PUBLICATIONS

Zhang, Jian-Chen et al. "Elucidation of O-Phosphoryl and N-Phosphoryl Amino Acids by Electrospray Ionization Tandem Mass Spectrometry"; Chinese Journal of Chemistry; Year: 2004; vol. 22, No. 8; pp. 870-873.

Yan, Qing-Jin et al. "Kinetics of Phosphoryl Transfer Reactions of Phosphoamino Acids and Esters in the Presence of Imidazole"; Phosphorus, Sulfur, and Silicon; Year: 1995; vol. 107, No. 1-4; pp. 181-188.

Hakimelahi, Gholam Hosein et al. "129. The Synthesis of 4-Decarboxy-4-phosphono-O-2-isooxacephems, -isopenams and -isooxacephems Containing Phosphorus at the 3-Position"; Helvetica Chimica Acta; Year: 1982; vol. 65, No. 5; pp. 1359-1367.

Sebastian, Dagmar et al. "Selective Enzymatic Removal of Protecting Groups from Phosphopeptides: Chemoenzymatic Synthesis of a Characteristic Phosphopeptide Fragment of the Raf-1 Kinase"; Synthesis; Year: 1997; No. 9; pp. 1098-1108.

Johnson, Thomas B. et al. "Synthesis of Oligophosphopeptides and Related ATP γ-Peptide Esters as Probes for cAMP-Dependent Protein Kinase"; Journal of Organic Chemistry; Year: 1987; vol. 52, No. 9; pp. 1771-1779.

Photaki, Iphigenia et al. "Lanthionine Chemistry. Part 5. Synthesis of Cyclic Non-symmetrical Lanthionyl Peptides"; Journal of the Chemical Society, Perkin Transactions 1: Organic and Bio-Organic Chemistry; Year: 1980; vol. 9; pp. 1965-1970.

Hoffmann, R. et al. "Chemical Phosphorylation of the Peptides GGXA (X=S, T, Y): An Evaluation of Different Chemical Approaches"; International Journal of Peptide & Protein Research; Year: 1995; vol. 45, No. 1; ISSN: 0367-8377; pp. 26-34.

RN: 1823439-51-5, Database Registry; Retrieved from STN; Dec. 6, 2015; pp. 1-1.

RN: 1037528-40-7, Database Registry; Retrieved from STN; Jul. 31, 2008; pp. 1-1.

\* cited by examiner

PHOSPHORUS-CONTAINING COMPOUND AND PREPARATION METHOD AND USE THEREOF

TECHNICAL FIELD

The invention relates to a phosphorus-containing compound, in particular to a phosphorus-containing compound capable of promoting biodegradation of lubricating oil, and a preparation method and use thereof.

BACKGROUND

Lubricating oil is a necessary working medium in the normal operation of mechanical equipment and the manufacturing and processing processes of materials, and with the rapid development of industry, the demand for lubricating oil is increased more and more. During the storage, transportation and use of the lubricating oil, the conditions of leakage, overflow, improper discharge and environmental pollution cannot be avoided. Although the lubricating oil has little acute toxicity to organisms, the lubricating oil entering the environment seriously pollutes land, rivers and lakes due to poor biodegradability, and meanwhile, the ecological balance is also influenced by the accumulation of the lubricating oil in the environment, so that a biodegradation accelerant is urgently needed to improve the biodegradation rate of the lubricating oil.

In recent years, the influence of waste and leaked lubricating oils on the environment has attracted considerable attention, and in order to solve this problem, on one hand, lubricating oils are prepared using biodegradable vegetable oils and synthetic oils of esters, such as biodegradable lubricating oil compositions and methods for preparing the same reported in CN 102408939B, and biodegradable industrial gear oil compositions reported in CN 105132104A; on the other hand, the research on the lubricating oil biodegradation accelerator is developed, for example, in patent CN 103642557B, the chemical formula is reported to be $C_{20}H_{37}NO_3$ amide type lubricating oil biodegradation accelerator, but at present, the research reports on the lubricating oil biodegradation accelerator are not yet common.

DISCLOSURE OF INVENTION

The present inventors have intensively studied and found that a phosphorus-containing compound having a specific structure as described in the present invention can achieve a good effect of promoting biodegradation of lubricating oil. The phosphorus-containing compound of the present invention is excellent in oxidation resistance, and can suppress oxidation of lubricating oil when blended in the lubricating oil.

Specifically, the present invention provides the following embodiments.

The invention provides a phosphorus-containing compound having the structure represented by the formula (I):

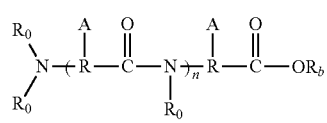
(I)

in the formula (I), n is an integer of 0 to 50 (preferably an integer of 0 to 20, more preferably an integer of 0 to 10, and further preferably 0, 1, 2, 3 or 4); n+1 R groups, identical to or different from each other, are independently selected from $C_1$-$C_{30}$ hydrocarbylene group (preferably $C_1$-$C_{10}$ alkylene group, more preferably $C_1$-$C_6$ alkylene group, and further preferably $C_1$-$C_4$ alkylene group); $R_b$ group is H or $C_1$-$C_{30}$ hydrocarbyl group (preferably H or $C_1$-$C_{10}$ hydrocarbyl group, more preferably H or $C_1$-$C_6$ linear or branched alkyl, and further preferably H or $C_1$-$C_4$ linear or branched alkyl);

each $R_0$ group, identical to or different from each other, is independently selected from H, $C_1$-$C_{30}$ hydrocarbyl group and

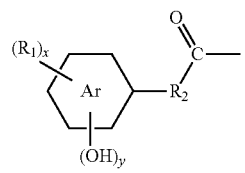

(preferably independently selected from H, $C_1$-$C_{10}$ linear or branched alkyl and

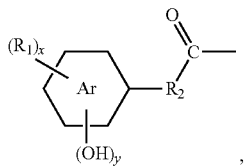

more preferably independently selected from H, $C_1$-$C_4$ linear or branched alkyl and

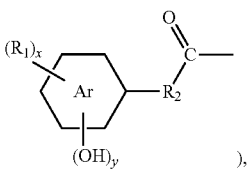), preferably at least one $R_0$ in the formula (I) is

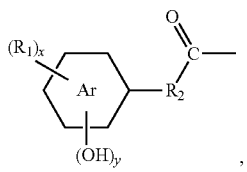

in

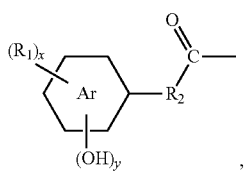

x is an integer of 0 to 5 (preferably an integer of 0 to 4, more preferably 0, 1, 2 or 3), y is an integer of 1 to 5 (preferably an integer of 1 to 4, more preferably 1, 2 or 3), and the sum of x+y is less than or equal to the number of hydrogen atoms which may be substituted on the Ar group; x $R_1$ groups, identical to or different from each other, and are independently selected from H, $C_1$-$C_{30}$ hydrocarbyl group (preferably from H, $C_1$-$C_{10}$ linear or branched alkyl, and more preferably H or $C_1$-$C_6$ linear or branched alkyl, and further preferably H or $C_1$-$C_4$ linear or branched alkyl), each Ar group, identical to or different from each other, and is independently selected from $C_3$-$C_{30}$ ring group (preferably from $C_6$-$C_{15}$ aromatic ring group, more preferably from benzene ring group, naphthalene ring group and anthracene ring group), $R_2$ group is a single bond or $C_1$-$C_{10}$ alkylene (preferably a single bond or $C_1$-$C_6$ alkylene, more preferably a single bond or $C_1$-$C_4$ alkylene);

each of the A group, identical to or different from each other, is independently selected from

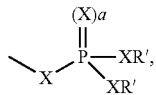

OH, $C_1$-$C_{30}$ hydrocarbyl group optionally substituted by

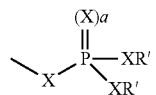

(preferably $C_1$-$C_{10}$ linear or branched alkyl group optionally substituted by

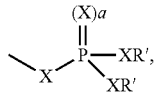

more preferably $C_1$-$C_6$ linear or branched alkyl group optionally substituted by

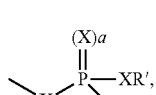

further preferably $C_1$-$C_4$ linear or branched alkyl group optionally substituted by

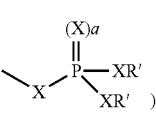

$C_1$-$C_{30}$ alkoxy group optionally substituted by

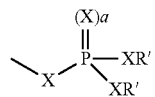

(preferably $C_1$-$C_{10}$ linear or branched alkoxy group optionally substituted by

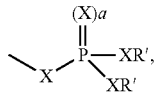

more preferably $C_1$-$C_6$ linear or branched alkoxy group optionally substituted by

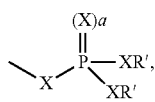

further preferably $C_1$-$C_4$ linear or branched alkoxy group optionally substituted by

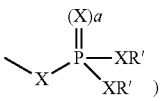

and H, and at least one A group in formula (I) is selected from

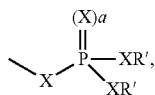

$C_1$-$C_{30}$ hydrocarbyl group substituted by

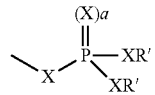

(preferably $C_1$-$C_{10}$ linear or branched alkyl group substituted by

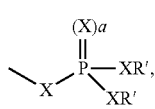

more preferably $C_1$-$C_6$ linear or branched alkyl group substituted by

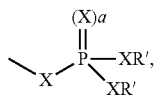

further preferably $C_1$-$C_4$ linear or branched alkyl group substituted by

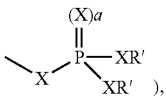

$C_1$-$C_{30}$ alkoxy group substituted by

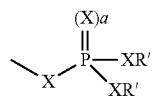

(preferably $C_1$-$C_{10}$ linear or branched alkoxy group substituted by

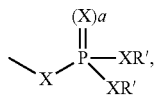

more preferably $C_1$-$C_6$ linear or branched alkoxy group substituted by

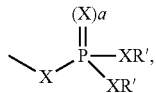

further preferably $C_1$-$C_4$ linear or branched alkoxy group substituted by

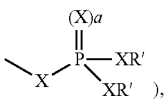

each X group is independently selected from O or S, a is 0 or 1, each R' is independently selected from $C_1$-$C_{30}$ hydrocarbyl group (preferably $C_1$-$C_{10}$ linear or branched alkyl, and more preferably $C_1$-$C_6$ linear or branched alkyl, and further preferably $C_1$-$C_4$ linear or branched alkyl), $C_7$-$C_{15}$ arylalkyl optionally substituted by $C_1$-$C_{10}$ linear or branched alkyl(preferably $C_7$-$C_{12}$ arylalkyl optionally substituted by $C_1$-$C_{10}$ linear or branched alkyl, more preferably benzyl optionally substituted by $C_1$-$C_{10}$ linear or branched alkyl), $C_6$-$C_{15}$ aryl optionally substituted by $C_1$-$C_{10}$ linear or branched alkyl (preferably $C_6$-$C_{10}$ aryl optionally substituted by $C_1$-$C_{10}$ linear or branched alkyl, more preferably phenyl optionally substituted by $C_1$-$C_{10}$ linear or branched alkyl)

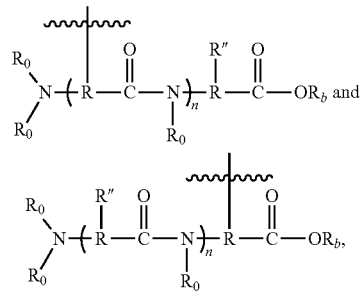

and R" is selected from $C_1$-$C_{30}$ hydrocarbyl group (preferably $C_1$-$C_{10}$) linear or branched alkyl, and more preferably $C_1$-$C_6$ linear or branched alkyl, and further preferably $C_1$-$C_4$ linear or branched alkyl), $C_1$-$C_{30}$ alkoxy group (preferably $C_1$-$C_{10}$ linear or branched alkoxy group, more preferably $C_1$-$C_6$ linear or branched alkoxy group, further preferably $C_1$-$C_4$ linear or branched alkoxy group), each of $R_0$, R, $R_b$, n is as defined above.

The present invention also provides a method for preparing a phosphorus-containing compound comprising:

step (1): reacting the compound represented by formula (II) and/or inorganic acid salt thereof with the compound represented by formula (III) to obtain the product of step (1),

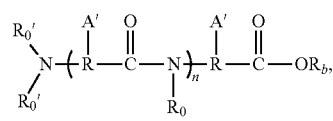

(II),

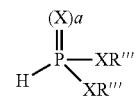

(III), in formula (II), n is an integer between 0 and 50 (preferably an integer between 0 and 20, more preferably an integer between 0 and 10, further preferably 0, 1, 2, 3 or 4); n+1 R groups, identical to or different from each other, are independently selected from $C_1$-$C_{30}$ hydrocarbylene group (preferably $C_1$-$C_{10}$ alkylene group, more preferably $C_1$-$C_6$ alkylene group, and further preferably $C_1$-$C_4$ alkylene group); $R_b$ group is H or $C_1$-$C_{30}$ hydrocarbyl group (preferably H or $C_1$-$C_{10}$ hydrocarbyl group, more preferably H or $C_1$-$C_6$ linear or branched alkyl, and further preferably H or $C_1$-$C_4$ linear or branched alkyl);

each $R_0'$ group, identical to or different from each other, is independently selected from H, $C_1$-$C_{30}$ hydrocarbyl group (preferably H, $C_1$-$C_{10}$ linear or branched alkyl, and more preferably H, $C_1$-$C_4$ linear or branched alkyl), preferably at least one $R_0'$ is H, each A' group, identical to or different from each other, is independently selected from XA''', $C_1$-$C_{30}$ hydrocarbyl group optionally substituted by XA''' (preferably $C_1$-$C_{10}$ linear or branched alkyl group optionally substituted by XA''', more preferably $C_1$-$C_6$ linear or branched alkyl group optionally substituted by XA''', further preferably $C_1$-$C_4$ linear or branched alkyl group optionally substituted by XA'''), $C_1$-$C_{30}$ alkoxy group optionally substituted by XA''' (preferably $C_1$-$C_{10}$ linear or branched alkoxy group optionally substituted by XA''', more preferably $C_1$-$C_6$ linear or branched alkoxy group optionally substituted by XA''', further preferably $C_1$-$C_4$ linear or branched alkoxy group optionally substituted by XA''') and H, A''' is selected from F, Cl, Br, I, H, X group is independently selected from O or S, wherein at least one A' group is selected from XA''', $C_1$-$C_{30}$ hydrocarbyl group substituted by XA''' (preferably $C_1$-$C_{10}$ linear or branched alkyl group substituted by XA''', more preferably $C_1$-$C_6$ linear or branched alkyl group substituted by XA''', further preferably $C_1$-$C_4$ linear or branched alkyl group substituted by XA'''), $C_1$-$C_{30}$ alkoxy group substituted by XA''' (preferably $C_1$-$C_{10}$ linear or branched alkoxy group substituted by XA''', more preferably $C_1$-$C_6$ linear or branched alkoxy group substituted by XA''', further preferably $C_1$-$C_4$ linear or branched alkoxy group substituted by XA''');

the structure of the inorganic acid salt of the compound represented by formula (II) is

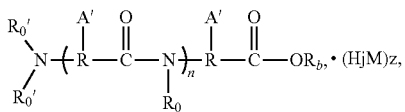

wherein M is the inorganic acid radical, j is the absolute value of the charge number of said inorganic acid radical, z is an integer between 1 and 10 (preferably an integer between 1 and 6, more preferably an integer between 1 and 3), and each of the other groups is defined as in formula (II) (the inorganic acid salt of said compound represented by formula (II) is preferably hydrochloride salt, nitrate salt, or sulfate salt, most preferably hydrochloride salt);

in formula (III), each X group is independently selected from O or S, a is 0 or 1, each R''', identical to or different from each other, is independently selected from A''', $C_1$-$C_{30}$ hydrocarbyl group (preferably $C_1$-$C_{10}$ linear or branched alkyl, and more preferably $C_1$-$C_6$ linear or branched alkyl, and further preferably $C_1$-$C_4$ linear or branched alkyl), $C_7$-$C_{15}$ arylalkyl optionally substituted by $C_1$-$C_{10}$ linear or branched alkyl(preferably $C_7$-$C_{12}$ arylalkyl optionally substituted by $C_1$-$C_{10}$ linear or branched alkyl, more preferably benzyl optionally substituted by $C_1$-$C_{10}$ linear or branched alkyl), and $C_6$-$C_{15}$ aryl optionally substituted by $C_1$-$C_{10}$ linear or branched alkyl (preferably $C_6$-$C_{10}$ aryl optionally substituted by $C_1$-$C_{10}$ linear or branched alkyl, more preferably phenyl optionally substituted by $C_1$-$C_{10}$ linear or branched alkyl);

and optional step (2): reacting the product of step (1) with the compound represented by formula (IV) to obtain the product of step (2),

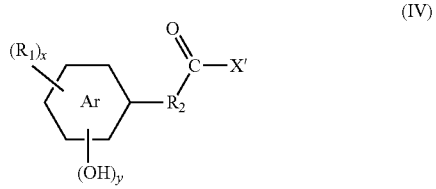

wherein x is an integer between 0 and 5 (preferably an integer between 0 and 4, more preferably 0, 1, 2 or 3), y is an integer between 1 and 5 (preferably an integer between 1 and 4, more preferably 1, 2 or 3), and the sum of x+y is less than or equal to the number of hydrogen atoms which may be substituted on the Ar group; x $R_1$ groups, identical to or different from each other, and are independently selected from H, $C_1$-$C_{30}$ hydrocarbyl group (preferably from H, $C_1$-$C_{10}$ linear or branched alkyl, and more preferably H or $C_1$-$C_6$ linear or branched alkyl, and further preferably H or $C_1$-$C_4$ linear or branched alkyl), Ar group is $C_3$-$C_{30}$ ring group (preferably from $C_6$-$C_{15}$ aromatic ring group, more preferably from benzene ring group, naphthalene ring group and anthracene ring group), $R_2$ group is a single bond or $C_1$-$C_{10}$ alkylene (preferably a single bond or $C_1$-$C_6$ alkylene, more preferably a single bond or $C_1$-$C_4$ alkylene), and X' is F, Cl, Br, I or OH (preferably Cl, Br).

The present invention also provides a use of the phosphorus-containing compound represented by formula (I) or the phosphorus-containing compound produced by the method for preparing a phosphorus-containing compound above as a biodegradation agent for lubricants.

The present invention also provides a lubricant composition comprising a lubricating base oil, at least one selected from the phosphorus-containing compounds represented by formula (I), the phosphorus-containing compound produced by the method for preparing a phosphorus-containing compound above, and the product obtained by partial or total condensation dehydration thereof.

Effects of the Invention

The phosphorus-containing compound of the present invention has excellent biodegradability and oxidation resistance, and is particularly suitable for promoting biodegradation of lubricating oil product. The phosphorus-containing compound of the present invention is excellent in oxidation resistance, and can suppress oxidation of lubricating oil when blended in the lubricating oil.

In addition, the method for preparing the phosphorus-containing compound of the present invention is simple and efficient, and the yield is high. The phosphorus-containing compound with excellent biodegradability and oxidation resistance can be prepared in the present invention.

DETAILED DESCRIPTION

Reference will now be made in detail to the present embodiments of the present invention, but it should be understood that the scope of the invention is not limited by the embodiments, but is defined by the appended claims.

All publications, patent applications, patents, and other references mentioned in this specification are herein incorporated by reference in their entirety. Unless defined otherwise, all technical and scientific terms used herein have the same meanings as commonly understood by those skilled in the art to which this invention belongs. In case of conflict, the present specification, including definitions, will control.

When the specification derives a material, a substance, a process, a step, a device, an element, and the like with the expression such as "known to those skilled in the art", "prior art", or the analogous term, it is intended that the subject matter so derived encompasses those having been conventionally used in the art at the time of filing this application, but also includes those which may not be so commonly used at present, but will become known in the art as being suitable for a similar purpose.

In the context of this specification, except for what is explicitly stated, any item or matter not mentioned is directly applicable to those known in the art without any changes. Moreover, any of the embodiments described herein can be freely combined with one or more other embodiments described herein, and the resulting technical solutions or technical ideas are regarded as part of the original disclosure or the original record of the present invention, and should not be regarded as new content that has not been disclosed or anticipated in this specification unless those skilled in the art believe that the combination is obviously unreasonable.

In the context of the present specification, the term "single bond" is sometimes used in the definition of a group. The so-called "single bond" means that the group does not exist. For example, assuming the structural formula —$CH_2$-A-$CH_3$, wherein the A group is defined to be selected from single bond and methyl. In view of this, if A is a single bond, it means that the A group does not exist, and the structural formula is correspondingly simplified to —$CH_2$—$CH_3$.

In the context of the present specification, the number of a certain group is 0, indicating that this group moiety does not exist, and at this time, the groups attached to both ends of this group moiety are bonded to each other. In addition, in case a group is located at the end, if the number of the group is 0, it means that other groups connected to this group are not substituted by this group. For example, assuming the structural formula —$CH_2$-$(A)_n$-$CH_3$, if n is 0, the structural formula is —$CH_2$—$CH_3$. Assuming the structural formula —$CH_2$-$(A)_n$, if n is 0, it means that the H in —$CH_2$—H is not substituted by A, and the structural formula is —$CH_3$.

In the present invention, the hydrocarbyl group refers to a group obtained by removing one or more hydrogen atoms from a hydrocarbon (hydrocarbon, including but not limited to alkane, alkene, alkyne, aromatic hydrocarbon, etc.), and the hydrocarbyl group may be classified into a monovalent group, a divalent group, a trivalent group, etc., as necessary, and the number of hydrogen atoms that can be substituted on the hydrocarbyl group is taken as the upper limit thereof. For example, a monovalent radical: $CH_3CH_2$— (ethyl), isopropyl, CH≡C—$CH_2$— (2-propynyl); a divalent group: $CH_3CH$= (ethylene), —CH=CH— (1, 2-ethenylene); a trivalent group: $CH_3$C≡ (ethenyl).

More specifically, in the present invention, $C_1$-$C_{30}$ hydrocarbyl group refers to a group obtained by removing one hydrogen atom or two or more hydrogen atoms as needed from any one carbon atom of a hydrocarbon having 1 to 30 carbon atoms (including but not limited to alkane, alkene, alkyne, aromatic hydrocarbon, etc.), and may be a monovalent or higher $C_1$-$C_{30}$ linear or branched alkyl, a monovalent or higher $C_2$-$C_{30}$ linear or branched alkenyl group, a monovalent or higher $C_2$-$C_{30}$ linear or branched alkynyl group, or a monovalent or higher $C_6$-$C_{30}$ aromatic hydrocarbyl group.

The $C_1$-$C_{30}$ linear or branched alkyl group includes $C_1$-$C_{20}$ linear or branched alkyl group, $C_1$-$C_{10}$ linear or branched alkyl group, $C_1$-$C_6$ linear or branched alkyl group, and $C_1$-$C_4$ linear or branched alkyl group. Specific examples of the alkyl group include a methyl group, an ethyl group, a propyl group, an isopropyl group, a butyl group, an isobutyl group, a tert-butyl group, a pentyl group, a hexyl group, a heptyl group, an octyl group, a nonyl group, a decyl group, an undecyl group, a dodecyl group, a hexadecyl group, an octadecyl group, an eicosyl group, a docosyl group, and isomers thereof. The alkylene group is a group obtained by further removing one hydrogen atom from the above alkyl group.

The $C_2$-$C_{30}$ linear or branched alkenyl group includes $C_2$-$C_{20}$ linear or branched alkenyl group, $C_2$-$C_{10}$ linear or branched alkenyl group, $C_2$-$C_6$ linear or branched alkenyl group, and $C_2$-$C_4$ linear or branched alkenyl group. Preferably alkenyl group comprises 1, 2, 3 or 4 carbon-carbon double bonds. Specific examples of the alkenyl group include a vinyl group, a propenyl group, a butenyl group, a 2-pentenyl group, a 1-hexenyl group, a 1-heptenyl group, a 1-octenyl group, isomers of these groups, and the like, but are not limited thereto, and for example, a group obtained by including 1 or 2 alkenyl in the specific examples of the alkyl group may be mentioned.

The $C_2$-$C_{30}$ linear or branched alkynyl group includes $C_2$-$C_{20}$ linear or branched alkynyl group, $C_2$-$C_{10}$ linear or branched alkynyl group, $C_2$-$C_6$ linear or branched alkynyl group, and $C_2$-$C_4$ linear or branched alkynyl group. Preferred alkynyl group comprises 1, 2, 3 or 4 carbon-carbon triple bonds. Specific examples of the alkynyl group include ethynyl, propynyl, butynyl, isomers thereof, and the like, but are not limited thereto, and for example, a group obtained by including 1 or 2 alkynyl in the specific examples of the alkyl group may be mentioned.

In the present invention, the $C_6$-$C_{30}$ aromatic hydrocarbyl group (aryl group) means a group obtained by removing one hydrogen atom from $C_6$-$C_{30}$ aromatic hydrocarbon, without violating the valence. The $C_6$-$C_{30}$ aromatic hydrocarbyl group includes a case where all carbon atoms are ring-forming carbon atoms of an aromatic ring, and also includes a case where an alkyl group, a cycloalkyl group, or an aryl group is bonded to an aromatic ring as a substituent, as long as the group structure has an aromatic ring and the total number of carbon atoms is 6 to 30. The $C_6$-$C_{30}$ aromatic hydrocarbyl group may include $C_6$-$C_{30}$ aromatic hydrocarbyl group, $C_6$-$C_{20}$ aromatic hydrocarbyl group, $C_6$-$C_{15}$ aromatic hydrocarbyl group, and $C_6$-$C_{10}$ aromatic hydrocarbyl group. Specific examples of the aryl group include, but are not limited to, phenyl, naphthyl, tolyl, xylyl, ethylphenyl, methylnaphthyl, 2-ethylnaphthyl, cyclohexylphenyl, and biphenyl.

In the present invention, $C_7$-$C_{15}$ arylalkyl refers to a group obtained by removing one hydrogen atom from the alkyl moiety of an arylalkane having 7 to 15 carbon atoms, without violating the valence. It should be noted that, in addition to the alkyl moiety having a bond, other alkyl group, cycloalkyl group, or aryl group may be bonded as a substituent to the aryl moiety, as long as the total number of carbon atoms is 7 to 15. The $C_7$-$C_{15}$ arylalkyl may include $C_7$-$C_{12}$ arylalkyl and $C_7$-$C_{10}$ arylalkyl. Specific examples of the arylalkyl group include, but are not limited to, benzyl (phenylmethyl), phenylethyl, phenylpropyl, naphthylmethyl, and naphthylethyl.

The $C_1$-$C_{30}$ hydrocarbylene group is a group obtained by removing one hydrogen atom from any carbon atom of the $C_1$-$C_{30}$ hydrocarbyl group without violating the valence. Examples of the $C_1$-$C_{30}$ hydrocarbylene include those obtained by removing one hydrogen atom from a carbon atom of the above-mentioned group exemplified as the $C_1$-$C_{30}$ hydrocarbyl group. In addition, when the $C_1$-$C_{30}$ hydrocarbyl group has other substituent, the hydrocarbyl group can also be divalent, trivalent or higher valence hydrocarbyl group.

In the invention, the $C_3$-$C_{30}$ ring group represents a group having 3-30 atoms selected from C, N, O, S as ring-forming atoms, and the ring group may be saturated, unsaturated (having at least one carbon-carbon double bond and/or at least one carbon-carbon triple bond), or aromatic group. The $C_3$-$C_{30}$ ring group includes $C_3$-$C_{25}$ cycloalkyl, $C_3$-$C_{20}$ cycloalkyl, $C_3$-$C_{10}$ cycloalkyl, $C_3$-$C_6$ cycloalkyl, $C_5$-$C_6$ cycloalkyl, $C_6$-$C_{20}$ aromatic cyclic-group, $C_6$-$C_{15}$ aromatic cyclic-group, and $C_6$-$C_{10}$ aromatic cyclic-group, and specific examples of the ring group include cyclopropane group, cyclobutane group, cyclopentane group, cyclohexane group, benzene ring group, naphthalene ring group, anthracene ring group, and phenanthrene ring group.

In the present invention, $C_1$-$C_{30}$ alkoxy group means a group by bonding the above-mentioned $C_1$-$C_{30}$ linear or branched alkyl group to an oxygen atom, that is, a $C_1$-$C_{30}$ linear or branched alkyl-O-group. The alkoxy group comprises a $C_1$-$C_{20}$ linear or branched alkoxy group, a $C_1$-$C_{10}$ linear or branched alkoxy group, a $C_1$-$C_6$ linear or branched alkoxy group and a $C_1$-$C_4$ linear or branched alkoxy group. The invention provides a phosphorus-containing compound having the structure represented by the formula (I):

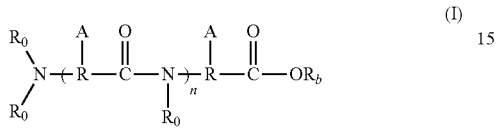
(I)

in the formula (I), n is an integer of 0 to 50 (preferably an integer of 0 to 20, more preferably an integer of 0 to 10, and further preferably 0, 1, 2, 3 or 4); n+1 R groups, identical to or different from each other, are independently selected from $C_1$-$C_{30}$ hydrocarbylene group (preferably $C_1$-$C_{10}$ alkylene group, more preferably $C_1$-$C_6$ alkylene group, and further preferably $C_1$-$C_4$ alkylene group); $R_b$ group is H or $C_1$-$C_{30}$ hydrocarbyl group (preferably H or $C_1$-$C_{10}$ hydrocarbyl group, more preferably H or $C_1$-$C_6$ linear or branched alkyl, and further preferably H or $C_1$-$C_4$ linear or branched alkyl);

each $R_0$ group, identical to or different from each other, is independently selected from H, $C_1$-$C_{30}$ hydrocarbyl group and

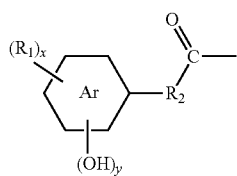

(preferably independently selected from H, $C_1$-$C_{10}$ linear or branched alkyl and

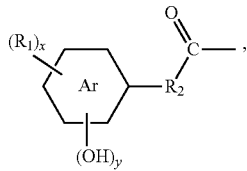

more preferably independently selected from H, $C_1$-$C_4$ linear or branched alkyl and

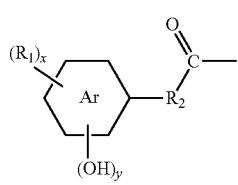

), preferably at least one $R_0$ in the formula (I) is

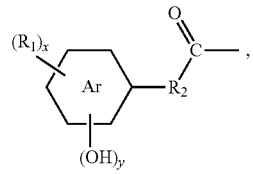

in,

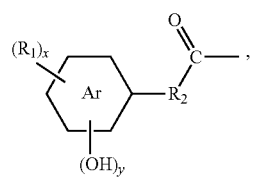

x is an integer of 0 to 5 (preferably an integer of 0 to 4, more preferably 0, 1, 2 or 3), y is an integer of 1 to 5 (preferably an integer of 1 to 4, more preferably 1, 2 or 3), and the sum of x+y is less than or equal to the number of hydrogen atoms which may be substituted on the Ar group; x $R_1$ groups, identical to or different from each other, and are independently selected from H, $C_1$-$C_{30}$ hydrocarbyl group (preferably from H, $C_1$-$C_{10}$ linear or branched alkyl, and more preferably H or $C_1$-$C_6$ linear or branched alkyl, and further preferably H or $C_1$-$C_4$ linear or branched alkyl), each Ar group, identical to or different from each other, and is independently selected from $C_3$-$C_{30}$ ring group (preferably from $C_6$-$C_{15}$ aromatic ring group, more preferably from benzene ring group, naphthalene ring group and anthracene ring group), $R_2$ group is a single bond or $C_1$-$C_{10}$ alkylene (preferably a single bond or $C_1$-$C_6$ alkylene, more preferably a single bond or $C_1$-$C_4$ alkylene);

each of the A group, identical to or different from each other, is independently selected from

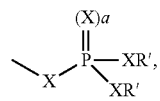

OH, $C_1$-$C_{30}$ hydrocarbyl group optionally substituted by

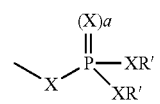

(preferably $C_1$-$C_{10}$ linear or branched alkyl group optionally substituted by

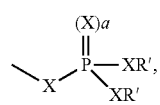

more preferably C₁-C₆ linear or branched alkyl group optionally substituted by

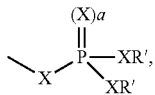

further preferably C₁-C₄ linear or branched alkyl group optionally substituted by

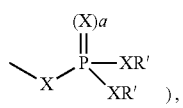

C₁-C₃₀ alkoxy group optionally substituted by

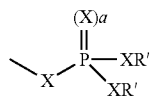

(preferably C₁-C₁₀ linear or branched alkoxy group optionally substituted by

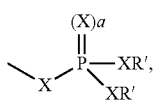

more preferably C₁-C₆ linear or branched alkoxy group optionally substituted by

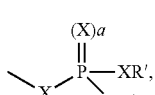

further preferably C₁-C₄ linear or branched alkoxy group optionally substituted by

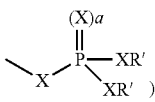

and H, and at least one A group in formula (I) is selected from

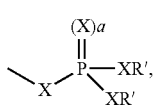

C₁-C₃₀ hydrocarbyl group substituted by

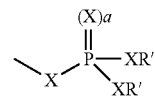

(preferably C₁-C₁₀ linear or branched alkyl group substituted by

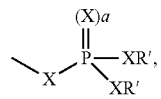

more preferably C₁-C₆ linear or branched alkyl group substituted by

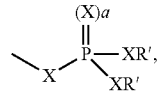

further preferably C₁-C₄ linear or branched alkyl group substituted by

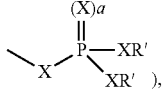

C₁-C₃₀ alkoxy group substituted by

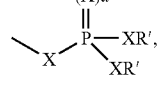

(preferably C₁-C₁₀ linear or branched alkoxy group substituted by

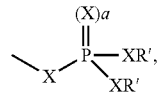

more preferably C₁-C₆ linear or branched alkoxy group substituted by further preferably C$_1$-C$_4$ linear or branched alkoxy group substituted by

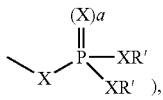

each X group is independently selected from O or S, a is 0 or 1, each R' is independently selected from C$_1$-C$_{30}$ hydrocarbyl group (preferably C$_1$-C$_{10}$ linear or branched alkyl, and more preferably C$_1$-C$_6$ linear or branched alkyl, and further preferably C$_1$-C$_4$ linear or branched alkyl), C$_7$-C$_{15}$ arylalkyl optionally substituted by C$_1$-C$_{10}$ linear or branched alkyl(preferably C$_7$-C$_{12}$ arylalkyl optionally substituted by C$_1$-C$_{10}$ linear or branched alkyl, more preferably benzyl optionally substituted by C$_1$-C$_{10}$ linear or branched alkyl), C$_6$-C$_{15}$ aryl optionally substituted by C$_1$-C$_{10}$ linear or branched alkyl (preferably C$_6$-C$_{10}$ aryl optionally substituted by C$_1$-C$_{10}$ linear or branched alkyl, more preferably phenyl optionally substituted by C$_1$-C$_{10}$ linear or branched alkyl)

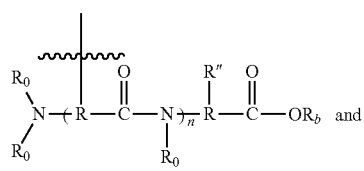

and

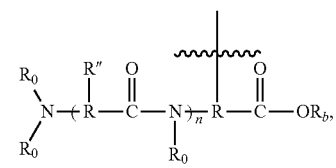

and R" is selected from C$_1$-C$_{30}$ hydrocarbyl group (preferably C$_1$-C$_{10}$ linear or branched alkyl, and more preferably C$_1$-C$_6$ linear or branched alkyl, and further preferably C$_1$-C$_4$ linear or branched alkyl), C$_1$-C$_{30}$ alkoxy group (preferably C$_1$-C$_{10}$ linear or branched alkoxy group, more preferably C$_1$-C$_6$ linear or branched alkoxy group, further preferably C$_1$-C$_4$ linear or branched alkoxy group), each of R$_0$, R, R$_b$, n is as defined above. Further, NH and COOH are present in the compound of formula (I) of the present invention, so the present invention also provides a product resulting from partial or total condensation dehydration between NH and COOH present in the structure of the compound of formula (I). Thus, among the compounds of formula (I) of the present invention, it is possible to include pure compounds of formula (I), mixtures of more than two compounds of formula (I) of different structures, and product obtained by dehydration condensation of two or more compounds of formula (I) having the same structure or different structures. Thus, the compounds of the present invention exhibit the form of a mixture.

In the structure of the compound of formula (I), preferably at least one R$_0$ is

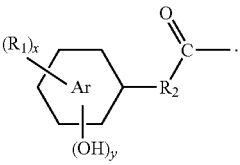

In the structure of the compound of formula (I), preferably in

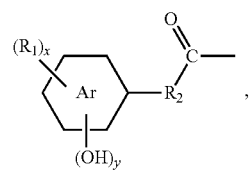

Ar group is preferably a benzene ring group, x is preferably 2, y is preferably 1, OH is preferably located at the para-position of R$_2$ group, two R$_1$ are preferably located at the two neighboring positions of OH, respectively.

In the compound represented by formula (I), preferably, R$_1$ is independently selected from C$_1$-C$_4$ linear or branched alkyl, preferably C$_3$-C$_4$ branched alkyl, and more preferably tert-butyl group.

In the structure of the compound of formula (I), preferably each A group is independently selected from

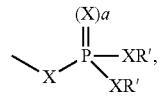

OH, C$_1$-C$_{10}$ hydrocarbyl group optionally substituted by

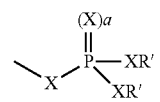

C$_1$-C$_{10}$ linear or branched alkoxy group optionally substituted by

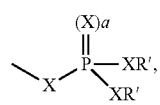

and H, and at least one A group is selected from

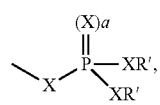

$C_1$-$C_{10}$ linear or branched alkyl substituted by

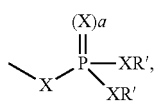

$C_1$-$C_{10}$ linear or branched alkoxy group substituted by

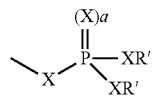

(preferably each A group is independently selected from

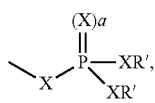

OH, $C_1$-$C_6$ linear or branched alkyl optionally substituted by

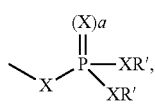

$C_1$-$C_6$ linear or branched alkoxy group optionally substituted by

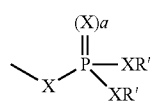

and H, and at least one A group is selected from

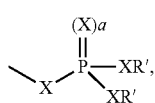

$C_1$-$C_6$ linear or branched alkyl substituted by

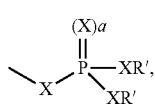

$C_1$-$C_6$ linear or branched alkoxy group substituted by

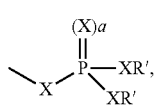

and further preferably each A group is independently selected from

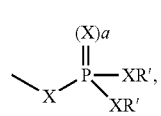

OH, $C_1$-$C_4$ linear or branched alkyl optionally substituted by

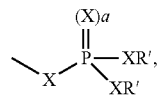

$C_1$-$C_4$ linear or branched alkoxy group optionally substituted by

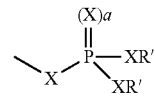

and H, and at least one A group is selected from

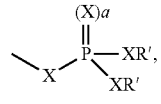

$C_1$-$C_4$ linear or branched alkyl substituted by

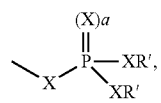

$C_1$-$C_4$ linear or branched alkoxy group substituted by

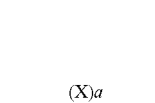

).

In the structure of the compound of formula (I), preferably, in A group, when the alkyl, alkoxy group is substituted by

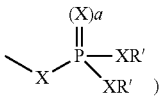

group is located at the terminal of the alkyl, alkoxy group.

In the structure of the compound of formula (I), preferably, at least one A group is

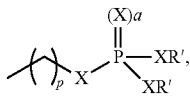

with p being an integer from 1 to 4.

In the structure of the compound of formula (I), preferably, R' is independently selected from $C_1$-$C_6$ linear or branched alkyl, benzyl optionally substituted by $C_1$-$C_{10}$ linear or branched alkyl, phenyl optionally substituted by $C_1$-$C_{10}$ linear or branched alkyl.

The phosphorus-containing compound of the present invention includes one or more of the specific compounds shown below.

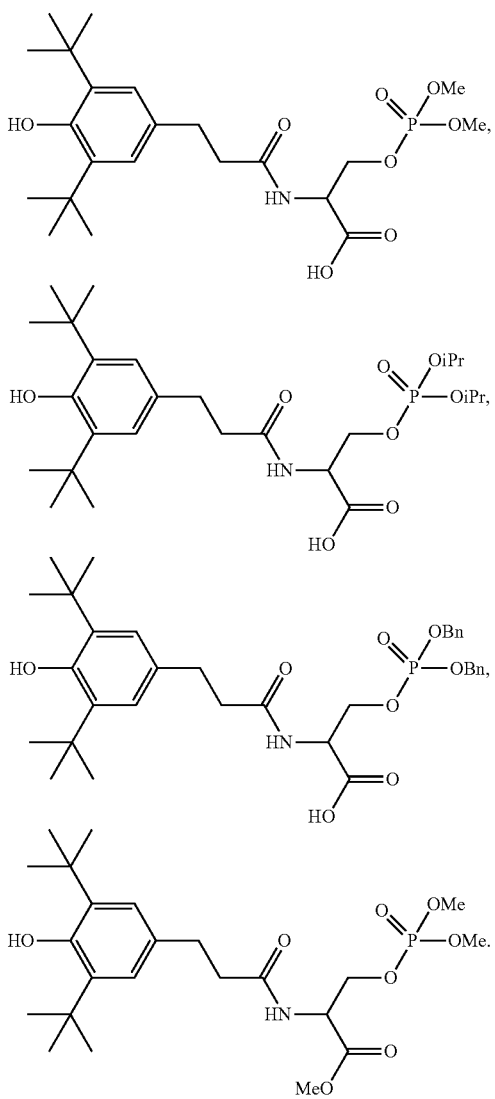

The present invention also provides a method for preparing a phosphorus-containing compound comprising:

Step (1): reacting the compound represented by formula (II) and/or inorganic acid salt thereof with the compound represented by formula (III) to obtain the product of step (1),

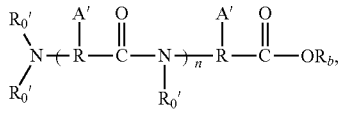

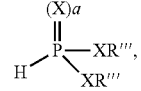

in formula (II), n is an integer between 0 and 50 (preferably an integer between 0 and 20, more preferably an integer between 0 and 10, further preferably 0, 1, 2, 3 or 4); n+1 R groups, identical to or different from each other, are independently selected from $C_1$-$C_{30}$ hydrocarbylene group (preferably $C_1$-$C_{10}$ alkylene group, more preferably $C_1$-$C_6$ alkylene group, and further preferably $C_1$-$C_4$ alkylene group); $R_b$ group is H or $C_1$-$C_{30}$ hydrocarbyl group (preferably H or $C_1$-$C_{10}$ hydrocarbyl group, further preferably H or $C_1$-$C_6$ linear or branched alkyl, and more preferably H or $C_1$-$C_4$ linear or branched alkyl);

each $R_0'$ group, identical to or different from each other, is independently selected from H, $C_1$-$C_{30}$ hydrocarbyl group (preferably H, $C_1$-$C_{10}$ linear or branched alkyl, and more preferably H, $C_1$-$C_4$ linear or branched alkyl), preferably at least one $R_0'$ is H, each A' group, identical to or different from each other, is independently selected from XA''', $C_1$-$C_{30}$ hydrocarbyl group optionally substituted by XA''' (preferably $C_1$-$C_{10}$ linear or branched alkyl group optionally substituted by XA''', more preferably $C_1$-$C_6$ linear or branched alkyl group optionally substituted by XA''', further preferably $C_1$-$C_4$ linear or branched alkyl group optionally substituted by XA'''), $C_1$-$C_{30}$ alkoxy group optionally substituted by XA''' (preferably $C_1$-$C_{10}$ linear or branched alkoxy group optionally substituted by XA''', more preferably $C_1$-$C_6$ linear or branched alkoxy group optionally substituted by XA''', further preferably $C_1$-$C_4$ linear or branched alkoxy group optionally substituted by XA''') and H, A''' is selected from F, Cl, Br, I, H, X group is independently selected from O or S, wherein at least one A' group is selected from XA''', $C_1$-$C_{30}$ hydrocarbyl group substituted by XA''' (preferably $C_1$-$C_{10}$ linear or branched alkyl group substituted by XA''', more preferably $C_1$-$C_6$ linear or branched alkyl group substituted by XA''', further preferably $C_1$-$C_4$ linear or branched alkyl group substituted by XA'''), $C_1$-$C_{30}$ alkoxy group substituted by XA''' (preferably $C_1$-$C_{10}$ linear or branched alkoxy group substituted by XA''', more preferably $C_1$-$C_6$ linear or branched alkoxy group substituted by XA''', further preferably $C_1$-$C_4$ linear or branched alkoxy group substituted by XA''');

the structure of the inorganic acid salt of the compound represented by formula (II) is

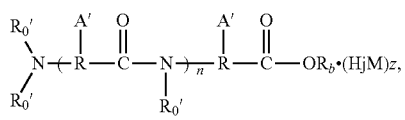

wherein M is the inorganic acid radical, j is the absolute value of the charge number of said inorganic acid radical, z is an integer between 1 and 10 (preferably an integer between 1 and 6, more preferably an integer between 1 and 3), and each of the other groups is defined as in formula (II) (the inorganic acid salt of said compound represented by formula (II) is preferably hydrochloride salt, nitrate salt, or sulfate salt, most preferably hydrochloride salt);

in formula (III), each X group is independently selected from O or S, a is 0 or 1, each R''', identical to or different from each other, is independently selected from A''', $C_1$-$C_{30}$ hydrocarbyl group (preferably $C_1$-$C_{10}$ linear or branched alkyl, and more preferably $C_1$-$C_6$ linear or branched alkyl, and further preferably $C_1$-$C_4$ linear or branched alkyl), $C_7$-$C_{15}$ arylalkyl optionally substituted by $C_1$-$C_{10}$ linear or branched alkyl(preferably $C_7$-$C_{12}$ arylalkyl optionally substituted by $C_1$-$C_{10}$ linear or branched alkyl, more preferably benzyl optionally substituted by $C_1$-$C_{10}$ linear or branched alkyl), and $C_6$-$C_{15}$ aryl optionally substituted by $C_1$-$C_{10}$ linear or branched alkyl (preferably $C_6$-$C_{10}$ aryl optionally substituted by $C_1$-$C_{10}$ linear or branched alkyl, more preferably phenyl optionally substituted by $C_1$-$C_{10}$ linear or branched alkyl);

and optional step (2): reacting the product of step (1) with the compound represented by formula (IV) to obtain the product of step (2).

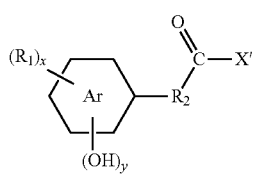

(IV)

wherein x is an integer between 0 and 5 (preferably an integer between 0 and 4, more preferably 0, 1, 2 or 3), y is an integer between 1 and 5 (preferably an integer between 1 and 4, more preferably 1, 2 or 3), and the sum of x+y is less than or equal to the number of hydrogen atoms which may be substituted on the Ar group; x $R_1$ groups, identical to or different from each other, and are independently selected from H, $C_1$-$C_{30}$ hydrocarbyl group (preferably from H, $C_1$-$C_{10}$ linear or branched alkyl, and more preferably H, $C_1$-$C_6$ linear or branched alkyl, and further preferably H, $C_1$-$C_4$ linear or branched alkyl), Ar group is $C_3$-$C_{30}$ ring group (preferably from $C_6$-$C_{15}$ aromatic ring group, more preferably from benzene ring group, naphthalene ring group and anthracene ring group), $R_2$ group is a single bond or $C_1$-$C_{10}$ alkylene (preferably a single bond or $C_1$-$C_6$ alkylene, more preferably a single bond or $C_1$-$C_4$ alkylene), and X' is F, Cl, Br, I or OH (preferably Cl, Br). According to the method of the present invention, the inorganic acid salt of the compound represented by formula (II) can be obtained by reacting the compound represented by formula (II) with an inorganic acid in a salt-forming reaction.

According to the method of the present invention, the compound represented by the formula (II) and/or the inorganic acid salt thereof may be one or more selected from an amino acid, a condensate of amino acids (a polypeptide formed by partial condensation or total condensation), an inorganic salt of an amino acid, and an inorganic salt of a condensate of amino acids (a polypeptide formed by partial condensation or total condensation). The compound represented by the formula (II) and/or the inorganic acid salt thereof can be selected from one or more of the following compounds: L-serine and/or L-serine ester hydrochloride, L-leucine and/or L-leucine ester hydrochloride, L-isoleucine and/or L-isoleucine ester hydrochloride, glycine and/or glycine ester hydrochloride, L-phenylalanine and/or L-phenylalanine ester hydrochloride, L-valine and/or L-valine ester hydrochloride.

According to the method of the invention, the compound represented by the formula (III) can be selected from phosphorous acid, phosphite, thiophosphorous acid and thiophosphite, and specific compounds may include one or more of phosphorous acid, dimethyl phosphite, diethyl phosphite, dipropyl phosphite, diisopropyl phosphite, di-n-butyl phosphite, diisobutyl phosphite, di-tert-butyl phosphite, (2-ethylhexyl) phosphite, dibenzyl phosphite, diphenyl phosphite, thiophosphorous acid, dimethyl thiophosphite, diethyl thiophosphite, dipropyl thiophosphite, diisopropyl thiophosphite, di-n-butyl thiophosphite, diisobutyl thiophosphite, di-tert-butyl thiophosphite, 2-ethylhexyl thiophosphite, dibenzyl thiophosphite and diphenyl thiophosphite.

According to the method of the invention, in the step (1), the reaction molar equivalent ratio of the compound represented by the formula (II) and/or the inorganic acid salt thereof (calculated as XA''') to the compound represented by the formula (III) (calculated as P—H) is preferably 1:5 to 5:1, and more preferably 1:3 to 3:1; the reaction temperature is preferably −40 to 80° C., and more preferably −20 to 40° C.; the reaction time is generally as long as possible, and the reaction time is preferably 0.5 to 30 hours, more preferably 1 to 8 hours, in order to improve the reaction efficiency.

According to the method of the present invention, in the step (1), a solvent may be added or not added, preferably a solvent is added to the reaction of the compound represented by the formula (II) and/or the inorganic acid salt thereof with the compound represented by the formula (III). The solvent is preferably one or more of a protic solvent, a hydrocarbon solvent and a furan-based solvent, and for example, one or more of n-hexane, benzene, toluene, tetrahydrofuran, dichloromethane, methanol, ethanol, isopropanol and water may be selected, and more preferably, a protic solvent, for example, one or more of methanol, ethanol, isopropanol and water may be selected. The amount of the solvent is not particularly limited, and is added in such a way as to promote the smooth progress of the reaction.

According to the method of the invention, in the step (1), in the reaction of the compound represented by the formula (II) and/or the inorganic acid salt thereof with the compound represented by the formula (III), a catalyst may be added or may not be added, and the catalyst is preferably added. The catalyst may be a phase transfer catalyst that may be selected from quaternary ammonium salts and/or crown ethers, preferably tetraalkylammonium halides, for example one or more of tetrabutylammonium bromide, trioctylammonium chloride, cetyltrimethylammonium bromide, triethylbenzylammonium chloride and 18-crown-6, more preferably tetrabutylammonium bromide. The amount of the catalyst is preferably 0.1-10% of the mass of the compound represented by the formula (II) and/or the inorganic acid salt thereof.

According to the method of the present invention, in the step (1), it is preferable to add a chloride when reacting the compound represented by the formula (II) and/or the inorganic acid salt thereof with the compound represented by the formula (III). The chloride is preferably hypochlorite and/or alkyl chloride, and the hypochlorite is preferably one or more of sodium hypochlorite, potassium hypochlorite and calcium hypochlorite. The hypochlorite may be used in the form of an aqueous solution. The alkyl chloride is preferably methyl chloride, and for example, one or more of carbon monochloride, carbon dichloride, carbon trichloride and carbon tetrachloride can be selected. The chloride is preferably an aqueous solution of hypochlorite, preferably having a concentration of 5% to 80%, more preferably an aqueous solution of sodium hypochlorite. The amount of the chloride is preferably 30-100 mL/100 mmol of the compound represented by the formula (II) and/or the inorganic acid salt thereof.

According to the preparation method of the invention, in the step (1), the reaction of the compound represented by the formula (II) and/or the inorganic acid salt thereof with the compound represented by the formula (III) is preferably carried out at pH 8-10 (preferably 8.5-9.5). The pH may be adjusted by adding an alkaline medium, preferably an alkaline solution, preferably an aqueous solution of one or more of sodium hydroxide, potassium hydroxide, lithium hydroxide and calcium hydroxide.

According to the method of the present invention, in the step (1), after the reaction of the compound represented by the formula (II) and/or the inorganic acid salt thereof with the compound represented by the formula (III), the reaction product is subjected to an optional extraction treatment, an optional drying treatment, and an optional ultrasonic treatment. Preferably, sonication is performed.

When the reaction product of step (1) is subjected to extraction treatment, the reaction product is preferably subjected to extraction treatment by a solvent, and more preferably subjected to extraction treatment by solvent in an acidic environment. The solvent is preferably one or more of ether solvent, ester solvent, alkyl chloride solvent and hydrocarbon solvent, and for example, one or more of petroleum ether, diethyl ether, ethyl acetate, dichloromethane, chloroform and toluene may be used. The extraction treatment is preferably performed for 1-3 times. The acid environment is obtained by adding acid solution to adjust the pH of a system comprising reaction product, wherein the pH is preferably 2-5, and more preferably 2.5-3.5; the acid solution is preferably one or more aqueous solutions of hydrochloric acid, acetic acid, nitric acid and sulfuric acid, and the concentration of the acid solution is preferably 1-10 mol/L. Preferably, an inorganic salt is added to the extraction treatment to improve extraction efficiency. The inorganic salt is preferably one or more of sodium chloride, potassium chloride, sodium sulfate and potassium sulfate.

When the reaction product of step (1) is dried, it is preferable to add a desiccant to dry the reaction product. The desiccant can be anhydrous magnesium chloride and/or anhydrous sodium sulfate.

When the reaction product of step (1) is subjected to ultrasonic treatment, the ultrasonic treatment is preferably performed in the presence of a solvent, preferably one or more of furan-based solvent, haloalkane solvent, ketone-based solvent, ester-based solvent and nitrile-based solvent, for example, one or more of tetrahydrofuran, dichloromethane, chloroform, acetone, ethyl acetate and acetonitrile may be used, and more preferably one or more of tetrahydrofuran, dichloromethane and acetonitrile. The time of ultrasonic treatment is preferably 1-10 hours, and more preferably 2-8 hours.

According to the method of the present invention, in the step (1), after the reaction of the compound represented by the formula (II) and/or the inorganic acid salt thereof with the compound represented by the formula (III), the reaction product of the step (1) is further subjected to purification treatment. The purification treatment comprises one or more of drying, evaporation, washing, distillation, recrystallization and centrifugation known in the art.

According to the preparation method of the present invention, in the optional step (2), the structure of the compound represented by the formula (IV) can be produced by a method known in the art, and is not particularly limited.

Preferably, in the structure of the compound of formula (IV)

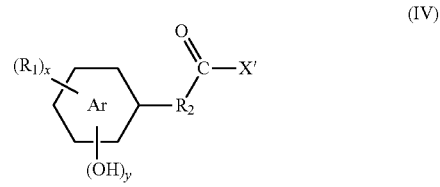

(IV)

Ar group is preferably a benzene ring group, x is preferably 2, y is preferably 1, OH is preferably located at the para-position of the $R_2$ group, two $R_1$ are preferably located at the two neighboring positions of OH, respectively, and X is preferably Cl or Br.

Preferably, in the structure of the compound of formula (IV), $R_1$ is independently selected from $C_1$-$C_4$ linear or branched alkyl, preferably $C_3$-$C_4$ branched alkyl, and more preferably tert-butyl group.

Preferably, in the structure of the compound of formula (III), each R''', identical to or different from each other, is independently selected from $C_1$-$C_6$ linear or branched alkyl, benzyl optionally substituted by $C_1$-$C_{10}$ linear or branched alkyl, and phenyl optionally substituted by $C_1$-$C_{10}$ linear or branched alkyl.

Preferably, in the structure of the compound of formula (II), in A' group, when the alkyl, alkoxy group is substituted by XA''', the XA''' group is located at the terminal of the alkyl, alkoxy group Preferably, in the structure of the compound of formula (II), at least one A' group is

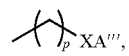

with p being an integer from 1 to 4.

The structure of the compound of formula (IV) can be synthesized using methods known in the art or can be commercially available.

As the compound represented by the formula (IV), one or more of the following compounds may be selected: 3,5-bis(tert-butyl)-4-hydroxyphenylacetyl chloride, 3,5-bis(tert-butyl)-4-hydroxyphenylpropionyl chloride, p-hydroxyphenylacetyl chloride, 3-hydroxyphenylacetyl chloride, 2-hydroxyphenylacetyl chloride, 3,4-dihydroxyphenylacetyl chloride, 3,5-dihydroxyphenylacetyl chloride, 3-methyl-4-hydroxyphenylacetyl chloride, 3,5-dimethyl-4-hydroxyphenylacetyl chloride, 2,4-dihydroxyphenylpropionyl chloride, 3,4-dihydroxyphenylpropionyl chloride, 2-hydroxy-naphthylacetyl chloride.

According to the method of the invention, in an optional step (2), the reaction molar equivalent ratio of the compound (calculated as X') represented by the formula (IV) to the reaction product (calculated as NH) in the step (1) is preferably 5:1-1:5, and more preferably 1:2-2 1; the reaction temperature is preferably −40 to 60° C., and more preferably −20 to 20° C.; the reaction time is generally as long as possible, and in order to improve the reaction efficiency, the reaction time is preferably 1 to 20 hours, more preferably 3 to 8 hours.

According to the method of the invention, in the optional step (2), a solvent may be added or not added, preferably a solvent is added, in the reaction of the compound represented by the formula (IV) (calculated as X') with the reaction product (calculated as NH thereof) of the step (1). The solvent is preferably one or more selected from the group consisting of protic solvent, ether solvent, ester solvent, alkyl chloride solvent, furan solvent, ketone solvent and hydrocarbon solvent, and for example, water, methanol, ethanol, isopropanol, dichloromethane, chloroform, diethyl ether, tetrahydrofuran, ethyl acetate, acetone and toluene may be selected, and more preferably one or more selected from the group consisting of water, ethanol, diethyl ether, tetrahydrofuran and acetone. The amount of the solvent is not particularly limited, and is added in such a way as to promote the smooth progress of the reaction. According to the method of the invention, in an optional step (2), after the reaction of the compound represented by the formula (IV) (calculated as X') with the reaction product (calculated as NH) of the step (1), the reaction product of the step (2) is subjected to washing treatment to improve the purity of the reaction product. The reaction product of the step (2) is preferably washed with an acid solution. The acid solution is preferably one or more of hydrochloric acid, sulfuric acid and nitric acid, and the concentration of the acid solution is preferably 1-12 mol/L. According to the method of the invention, in an optional step (2), after the reaction of the compound represented by the formula (IV) (calculated as X') with the reaction product (calculated as NH therein) of the step (1), the reaction product of the step (2) is further subjected to purification treatment. The purification treatment comprises one or more of washing, distillation, recrystallization and centrifugation known in the art.

The phosphorus-containing compound of the present invention can be used as a biodegradation agent for lubricating oil.

The phosphorus-containing compound produced by the method for preparing a phosphorus-containing compound of the present invention can be used as a biodegradation agent for lubricating oil.

The invention also provides a composition comprising phosphorus-containing compounds, which comprises one or more mixtures of the phosphorus-containing compound of the present invention or the phosphorus-containing compounds produced by the method of the invention, and product obtained by partial or total condensation dehydration thereof.

The present invention also provides a lubricating oil composition comprising a lubricating base oil, at least one selected from the group consisting of the above-mentioned phosphorus-containing compound of the present invention, the phosphorus-containing compound produced by the method of the present invention, and the composition comprising the phosphorus-containing compound of the present invention.

In the lubricating oil composition of the present invention, the phosphorus-containing compound and a product obtained by partial or total condensation dehydration thereof are contained in an amount of 0.001 to 30%, preferably 0.01 to 20%, more preferably 0.1 to 10%, based on the total mass of the lubricating oil composition.

The phosphorus-containing compound has excellent biodegradability and oxidation resistance, and is particularly suitable for promoting biodegradation of lubricating oil product. The preparation method of the phosphorus-containing compound is simple and efficient, and the yield is high.

EXAMPLES

The present invention is further illustrated below by specific examples, however, the invention is not restricted to said examples.

The experimental methods described in the following examples are all conventional methods unless otherwise specified; the reagents and materials are commercially available, unless otherwise specified.

The abbreviations in the examples have the following meanings:

Me: methyl iPr: isopropyl

Bn: benzyl

Example 1

Synthesis of O-dimethyloxyphosphoryl-N-3,5-bis(tert-butyl)-4-hydroxyphenylpropionyl-L-serine (1) L-serine (represented by formula II-a) (100 mmol, 10.5 g) and 40 mL of water were sequentially added to a reactor, the temperature was reduced to 0° C., sodium hydroxide was added for adjusting the pH=9.0, dimethyl phosphite (represented by formula III-a) (130 mmol, 14.3 g) and tetrabutylammonium bromide (1 mmol, 0.32 g) were added, and 50 mL of 12% sodium hypochlorite solution was dropwise added under stirring. After 4 hours of reaction, extraction was performed with ethyl ether 2 times, the aqueous layer was adjusted to pH=3 with hydrochloric acid, 8 g of sodium chloride was added, extraction was performed with ethyl acetate 2 times, the organic phases were combined, dried with anhydrous magnesium chloride, and the solvent was distilled off under reduced pressure to give a colorless oily substance. The colorless oily substance was dissolved in 60 mL acetonitrile, then subjected to ultrasonic treatment for 5 hours at room temperature, and filtered to obtain a white solid;

(2) the above white solid (47.6 mmol, 10.2 g), 40 mL acetone, 20 mL water, sodium hydroxide (95.2 mmol, 10 g) were cooled to 0° C., and 3,5-bis(tert-butyl)-4-hydroxyphenylpropionyl chloride (47.6 mmol, 14.1 g) was added. After 5 hours of reaction, 6 mol/L hydrochloric acid solution was added for acidifying until pH was 2, a large amount of white solid was obtained, then filtered, a filter cake was washed with water and petroleum ether, and the reaction product of the step (2) was obtained, wherein the structure and the example reaction scheme were shown as follows, and the structure of the reaction product of the step (2) is the formula I-a in the example reaction scheme.

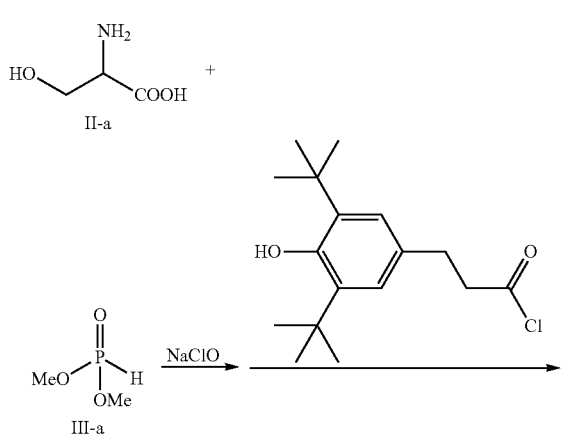

-continued

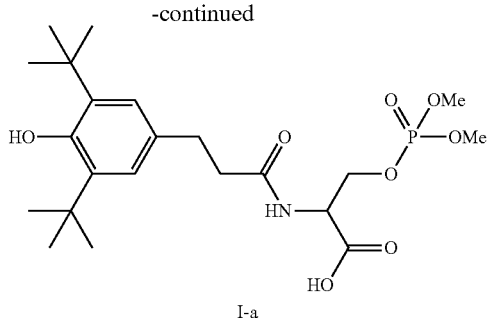

I-a

Wherein the preparation method of the 3,5-bis(tert-butyl)-4-hydroxy phenylpropionyl chloride in the step (2) comprised the following steps: 3,5-bis(tert-butyl)-4-hydroxyphenylpropionic acid (81 mmol, 22.5 g) was dissolved in 150 mL of chloroform, thionyl chloride (124 mmol, 14.8 g) was added, reflux was carried out for 4 hours, and the solvent and excess thionyl chloride were removed by rotary evaporation to give a pale yellow solid (i.e., 3,5-bis(tert-butyl)-4-hydroxyphenylpropionyl chloride).

The structure of the reaction product of the step (2) was characterized as follows: $^1$H NMR (400 MHz, CDCl$_3$) δ 12.19 (br, 1H), 8.71 (s, 1H), 6.96 (s, 2H), 5.97 (br, 1H), 4.66 (d, J=6.4 Hz, 2H), 4.07 (t, J=6.8 Hz, 1H), 3.79 (s, 6H), 2.87 (t, J=6.8 Hz, 2H), 2.49 (t, J=6.8 Hz, 2H), 1.31 (s, 18H); HRMS (FT-ICRMS) calcd for C$_{22}$H$_{35}$NO$_8$P$^-$ (M-H): 472.2106, found: 472.2109.

The compound synthesized is confirmed to be the target compound O-dimethyloxyphosphoryl-N-3,5-bis(tert-butyl)-4-hydroxyphenylpropionyl-L-serine (represented by a structural formula I-a), by identification.

Example 2

Synthesis of O-diisopropyloxyphosphoryl-N-3,5-bis(tert-butyl)-4-hydroxyphenyl propionyl-L-serine (1) L-serine (represented by formula II-a) (100 mmol, 10.5 g) and 40 mL of water were sequentially added to a reactor, the temperature was reduced to 0° C., sodium hydroxide was added for adjusting the pH=9.0, diisopropyl phosphite (represented by formula III-b) (130 mmol, 21.7 g) and tetrabutylammonium bromide (1 mmol, 0.32 g) were added, and 50 mL of 12% sodium hypochlorite solution was dropwise added under stirring. After 4 hours of reaction, extraction was performed with ethyl ether 2 times, the aqueous layer was adjusted to pH=3 with hydrochloric acid, 8 g of sodium chloride was added, extraction was performed with ethyl acetate 2 times, the organic phases were combined, dried with anhydrous magnesium chloride, and the solvent was distilled off under reduced pressure to give a colorless oily substance. The colorless oily substance was dissolved in 60 mL acetonitrile, then subjected to ultrasonic treatment for 5 hours at room temperature, and filtered to obtain a white solid;

(2) the above white solid (47.6 mmol, 12.8 g), 40 mL acetone, 20 mL water, sodium hydroxide (95.2 mmol, 10 g) were cooled to 0° C., and 3,5-bis(tert-butyl)-4-hydroxyphenylpropionyl chloride (47.6 mmol, 14.1 g) was added. After 5 hours of reaction, 6 mol/L hydrochloric acid solution was added for acidifying until pH was 2, a large amount of white solid was obtained, then filtered, a filter cake was washed with water and petroleum ether, and the reaction product of the step (2) was obtained, wherein the structure and the example reaction scheme were shown as follows, and the structure of the reaction product of the step (2) is the formula I-b in the example reaction scheme.

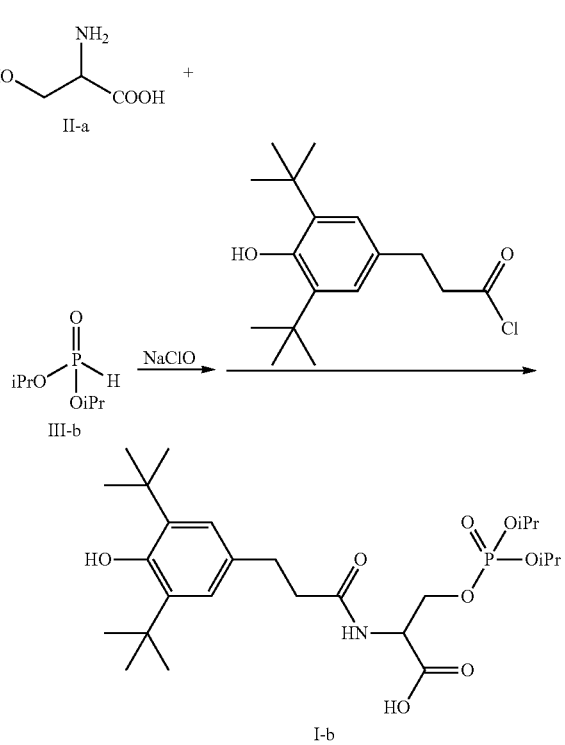

I-b

Wherein the preparation method of the 3,5-bis(tert-butyl)-4-hydroxyphenylpropionyl chloride in the step (2) comprised the following steps: 3,5-bis(tert-butyl)-4-hydroxyphenylpropionic acid (81 mmol, 22.5 g) was dissolved in 150 mL of chloroform, thionyl chloride (124 mmol, 14.8 g) was added, reflux was carried out for 4 hours, and the solvent and excess thionyl chloride were removed by rotary evaporation to give a pale yellow solid (i.e., 3,5-bis(tert-butyl)-4-hydroxyphenylpropionyl chloride).

The structure of the reaction product of the step (2) was characterized as follows: $^1$H NMR (400 MHz, CDCl$_3$) δ 12.10 (br, 1H), 8.55 (s, 1H), 6.88 (s, 2H), 5.85 (br, 1H), 4.61 (d, J=6.4 Hz, 2H), 4.09 (t, J=6.8 Hz, 1H), 3.99-3.89 (m, 2H), 2.81 (t, J=6.8 Hz, 2H), 2.44 (t, J=6.8 Hz, 2H), 1.31 (s, 18H), 1.25 (s, 12H); HRMS (FT-ICRMS) calcd for C$_{26}$H$_{43}$NO$_8$P$^-$ (M-H): 528.2732, found: 528.2737.

The compound synthesized is confirmed to be the target compound 0-diisopropyloxyphosphoryl-N-3,5-bis(tert-butyl)-4-hydroxyphenylpropionyl-L-serine (represented by a structural formula I-b), by identification.

Example 3

Synthesis of O-dibenzyloxyphosphoryl-N-3,5-bis(tert-butyl)-4-hydroxyphenyl propionyl-L-serine (1) L-serine (represented by formula II-a) (100 mmol, 10.5 g) and 40 mL of water were sequentially added to a reactor, the temperature was reduced to 0° C., sodium hydroxide was added for adjusting the pH=9.0, dibenzyl phosphite (represented by formula III-c) (130 mmol, 34.0 g) and tetrabutylammonium bromide (1 mmol, 0.32 g) were added, and 50 mL of 12% sodium hypochlorite solution was dropwise added under stirring. After 4 hours of reaction, extraction was performed with ethyl ether 2 times, the aqueous layer was adjusted to pH=3 with hydrochloric acid, 8 g of sodium chloride was added, extraction was performed with ethyl acetate 2 times, the organic phases were combined, dried with anhydrous magnesium chloride, and the solvent was distilled off under reduced pressure to give a colorless oily substance. The colorless oily substance was dissolved in 60 mL acetonitrile, then subjected to ultrasonic treatment for 5 hours at room temperature, and filtered to obtain a white solid;

(2) the above white solid (47.6 mmol, 17.4 g), 40 mL acetone, 20 mL water, sodium hydroxide (95.2 mmol, 10 g) were cooled to 0° C., and 3,5-bis(tert-butyl)-4-hydroxyphenylpropionyl chloride (47.6 mmol, 14.1 g) was added. After 5 hours of reaction, 6 mol/L hydrochloric acid solution was added for acidifying until pH was 2, a large amount of white solid was obtained, then filtered, a filter cake was washed with water and petroleum ether, and the reaction product of the step (2) was obtained, wherein the structure and the example reaction scheme were shown as follows, and the structure of the reaction product of the step (2) is the formula I-c in the example reaction scheme.

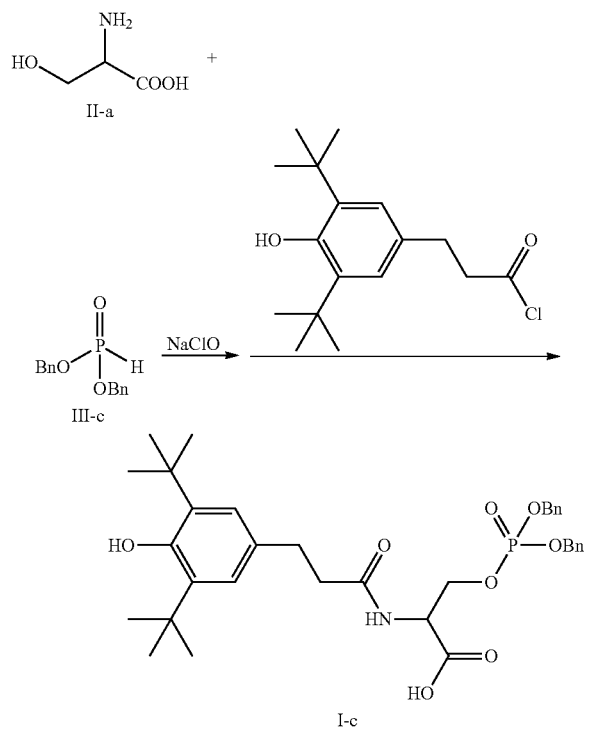

Wherein the preparation method of the 3,5-bis(tert-butyl)-4-hydroxyphenylpropionyl chloride in the step (2) comprised the following steps: 3,5-bis(tert-butyl)-4-hydroxyphenylpropionic acid (81 mmol, 22.5 g) was dissolved in 150 mL of chloroform, thionyl chloride (124 mmol, 14.8 g) was added, reflux was carried out for 4 hours, and the solvent and excess thionyl chloride were removed by rotary evaporation to give a pale yellow solid (i.e., 3,5-bis(tert-butyl)-4-hydroxyphenylpropionyl chloride).

The structure of the reaction product of the step (2) was characterized as follows: $^1$H NMR (400 MHz, CDCl$_3$) δ 12.27 (br, 1H), 8.64 (s, 1H), 7.55-7.26 (m, 10H), 6.91 (s, 2H), 5.71 (br, 1H), 5.17 (s, 4H), 4.61 (d, J=6.4 Hz, 2H), 4.01 (t, J=6.8 Hz, 1H), 2.81 (t, J=6.8 Hz, 2H), 2.44 (t, J=6.8 Hz, 2H), 1.32 (s, 18H); HRMS (FT-ICRMS) calcd for C$_{34}$H$_{43}$NO$_8$P$^-$ (M-H): 624.2732, found: 624.2730.

The compound synthesized is confirmed to be the target compound O-dibenzyloxyphosphoryl-N-3,5-bis(tert-butyl)-4-hydroxyphenylpropionyl-L-serine (represented by a structural formula I-c), by identification.

Example 4

Synthesis of O-dimethyloxyphosphoryl-N-3,5-bis(tert-butyl)-4-hydroxyphenylpropionyl-L-serine Methyl Ester (1) L-serine serine methyl ester hydrochloride (represented by formula II-b) (100 mmol, 15.5 g) and 40 mL of water were sequentially added to a reactor, the temperature was reduced to 0° C., sodium hydroxide was added for adjusting the pH=9.0, dimethyl phosphite (represented by formula III-a) (130 mmol, 14.3 g) and tetrabutylammonium bromide (1 mmol, 0.32 g) were added, and 50 mL of 12% sodium hypochlorite solution was dropwise added under stirring. After 4 hours of reaction, extraction was performed with ethyl ether 2 times, the aqueous layer was adjusted to pH=3 with hydrochloric acid, 8 g of sodium chloride was added, extraction was performed with ethyl acetate 2 times, the organic phases were combined, dried with anhydrous magnesium chloride, and the solvent was distilled off under reduced pressure to give a colorless oily substance. The colorless oily substance was dissolved in 60 mL acetonitrile, then subjected to ultrasonic treatment for 5 hours at room temperature, and filtered to obtain a white solid;

(2) the above white solid (47.6 mmol, 10.8 g), 40 mL acetone, 20 mL water, sodium hydroxide (95.2 mmol, 10 g) were cooled to 0° C., and 3,5-bis(tert-butyl)-4-hydroxyphenylpropionyl chloride (47.6 mmol, 14.1 g) was added. After 5 hours of reaction, 6 mol/L hydrochloric acid solution was added for acidifying until pH was 2, a large amount of white solid was obtained, then filtered, a filter cake was washed with water and petroleum ether, and the reaction product of the step (2) was obtained, wherein the structure and the example reaction scheme were shown as follows, and the structure of the reaction product of the step (2) is the formula I-d in the example reaction scheme.

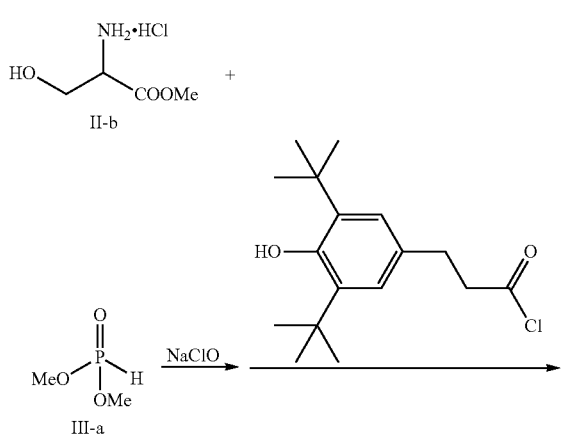

-continued

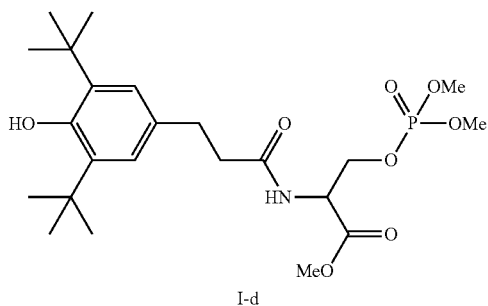

I-d

Wherein the preparation method of the 3,5-bis(tert-butyl)-4-hydroxyphenylpropionyl chloride in the step (2) comprised the following steps: 3,5-bis(tert-butyl)-4-hydroxyphenylpropionic acid (81 mmol, 22.5 g) was dissolved in 150 mL of chloroform, thionyl chloride (124 mmol, 14.8 g) was added, reflux was carried out for 4 hours, and the solvent and excess thionyl chloride were removed by rotary evaporation to give a pale yellow solid (i.e., 3,5-bis(tert-butyl)-4-hydroxyphenylpropionyl chloride).

The structure of the reaction product of the step (2) was characterized as follows: $^1$H NMR (400 MHz, CDCl$_3$) δ 8.54 (s, 1H), 6.91 (s, 2H), 5.77 (br, 1H), 4.60 (d, J=6.4 Hz, 2H), 4.11 (t, J=6.8 Hz, 1H), 3.73 (s, 6H), 3.61 (s, 3H), 2.80 (t, J=6.8 Hz, 2H), 2.52 (t, J=6.8 Hz, 2H), 1.35 (s, 18H); HRMS (FT-ICRMS) calcd for $C_{23}H_{37}NO_8P^-$ (M-H): 486.2262, found: 486.2268.

The compound synthesized is confirmed to be the target compound O-dimethyloxyphosphoryl-N-3,5-bis(tert-butyl)-4-hydroxyphenylpropionyl-L-serine methyl ester (represented by a structural formula I-d), by identification.

Example 5

The above phosphorus-containing compounds were added to various kinds of lubricating oils at a ratio of 1% by mass, respectively, and the biodegradability was measured according to the method of OECD302B, and the measurement results were shown in Table 1.

TABLE 1

| | | Biodegradability | | | |
|---|---|---|---|---|---|
| Lubricating oil name | Example 1 | Example 2 | Example 3 | Example 4 | Blank group |
| HVI 350 | 63.9% | 75.8% | 77.4% | 64.6% | 23.5% |
| PAO4 | 68.1% | 80.4% | 81.4% | 66.2% | 25.7% |
| PAO10 | 61.2% | 72.1% | 75.9% | 60.3% | 22.3% |

The above phosphorus-containing compounds were added to various kinds of lubricating oils at a ratio of 1 mass %, respectively, and the oxidation induction period of the lubricating oil was measured by differential scanning calorimetry (PDSC method) under an oxygen pressure of 500 kPa at 200° C. and the measurement results were shown in Table 2.

TABLE 2

| | | Oxidation induction period test | | | |
|---|---|---|---|---|---|
| Lubricating oil name | Example 1 | Example 2 | Example 3 | Example 4 | Blank group |
| HVI 350 | 24.7 min | 22.9 min | 25.1 min | 25.9 min | 6.7 min |
| PAO4 | 36.1 min | 34.2 min | 37.4 min | 38.8 min | 15.4 min |
| PAO10 | 33.4 min | 33.1 min | 34.2 min | 35.5 min | 14.9 min |

The above results indicated that the phosphorus-containing compound of the present invention can improve the biodegradability of lubricating oil. Moreover, the phosphorus-containing compound of the present invention is excellent in oxidation resistance, and can suppress oxidation of lubricating oil when blended in the lubricating oil.

It should be noted by those skilled in the art that the described embodiments of the present invention are merely exemplary and that various other substitutions, alterations, and modifications may be made within the scope of the present invention. Accordingly, the present invention is not limited to the above-described embodiments, but is only limited by the claims.

The invention claimed is:

1. A phosphorus-containing compound of formula (I):

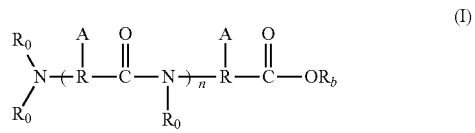

wherein, in formula (I), n is 0, 1, 2, 3, or 4;

the plural R groups, identical to or different from each other, are independently selected from $C_1$-$C_6$ alkylene group;

the $R_b$ group is H or $C_1$-$C_6$ linear or branched alkyl;

the plural $R_0$ groups, identical to or different from each other, are independently selected from H, $C_1$-$C_{10}$ linear alkyl, $C_1$-$C_{10}$ branched alkyl, and

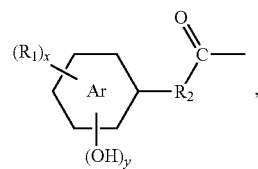

with the proviso that at least one $R_0$ in formula (I) is

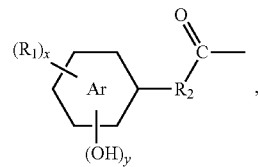

in

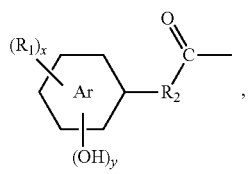

x is 1, 2, or 3, y is an integer of 1 to 5, and a sum of x+y is less than or equal to a number of hydrogen atoms available to be substituted on the Ar group;
the plural $R_1$ groups, identical to or different from each other, are independently selected from H, $C_1$-$C_6$ linear alkyl, and $C_1$-$C_6$ branched alkyl, the plural Ar groups, are benzene rings, $R_2$ group is a single bond or $C_1$-$C_6$ alkylene;
the plural A groups, identical to or different from each other, are independently selected from

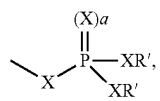

and $C_1$-$C_{10}$ linear or branched alkyl group substituted by

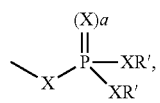

each X group is O, a is 1, each R' is independently selected from $C_1$-$C_{10}$ linear alkyl, $C_1$-$C_{10}$ branched alkyl, benzyl optionally substituted by $C_1$-$C_{10}$ linear or branched alkyl, and phenyl optionally substituted by $C_1$-$C_{10}$ linear or branched alkyl.

2. The phosphorus-containing compound according to claim 1, wherein, in

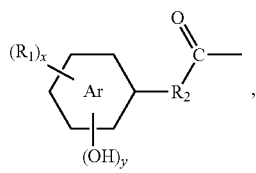

the Ar group is a benzene ring, x is 2, y is 1, OH is located at the para-position of the $R_2$ group, two $R_1$ are respectively located at the two neighboring positions of OH, and two $R_1$ are independently selected from $C_1$-$C_4$ linear alkyl and $C_1$-$C_4$ branched alkyl.

3. The phosphorus-containing compound according to claim 1, wherein, in formula (I), each A group is independently selected from

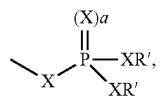

$C_1$-$C_4$ linear alkyl substituted by

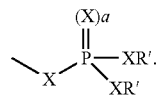

and $C_1$-$C_4$ branched alkyl substituted by

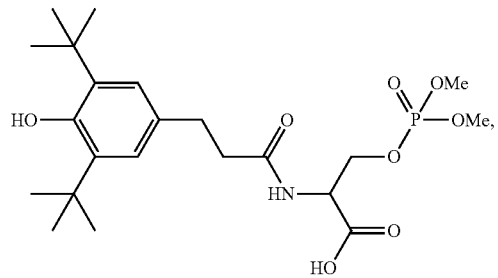

4. The phosphorus-containing compound according to claim 1, wherein the phosphorus-containing compound is selected from

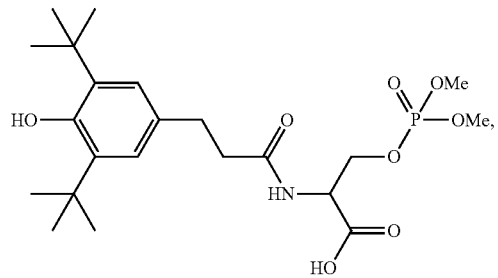

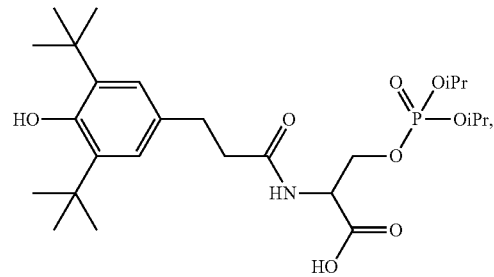

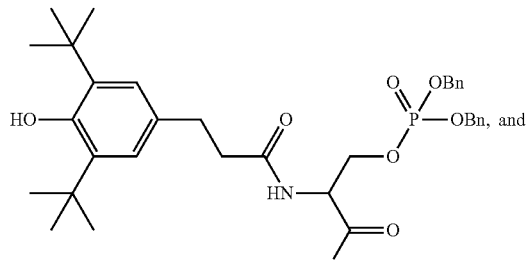

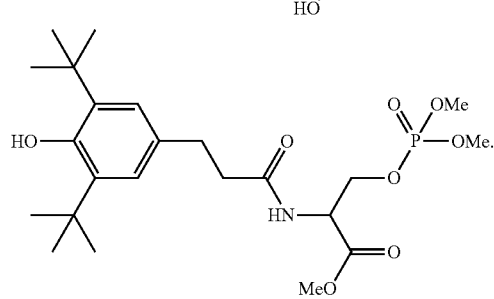

5. A method for preparing a phosphorus-containing compound according to claim 1 comprising:
step (1): reacting the compound of formula (II) and/or inorganic acid salt thereof with the compound of formula (III) to obtain the product of step (1),

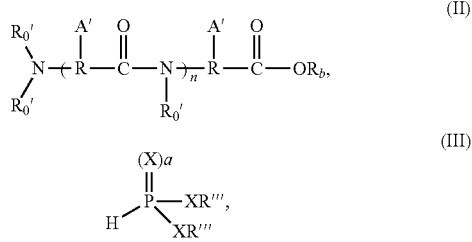

in formula (II), n is 0, 1, 2, 3, or 4 the plural R groups, identical to or different from each other, are independently selected from $C_1$-$C_6$ alkylene group; the $R_b$ group is H, $C_1$-$C_6$ linear alkyl, or $C_1$-$C_6$ branched alkyl;
the plural $R_0'$ groups, identical to or different from each other, are independently selected from H, $C_1$-$C_{10}$ linear alkyl, and $C_1$-$C_{10}$ branched alkyl, with the proviso that at least one $R_0'$ is H,
the plural A' groups, identical to or different from each other, are independently selected from XA''', $C_1$-$C_{10}$ linear alkyl optionally substituted by XA''', and $C_1$-$C_{10}$ branched alkyl substituted by XA''', A''' is H,
X group is O;
the inorganic acid salt of the compound of formula (II) is

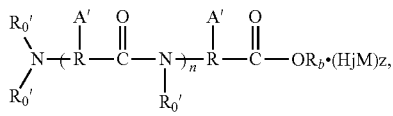

wherein M is the inorganic acid radical, j is the absolute value of the charge number of said inorganic acid radical, z is an integer between 1 and 10, and each of the other groups is defined as in formula (II), the inorganic acid salt of said compound of formula (II) is hydrochloride salt, nitrate salt, or sulfate salt;
in formula (III), each X group is O, a is 1, each R'' is independently selected from $C_1$-$C_{10}$ linear or branched alkyl, benzyl optionally substituted by $C_1$-$C_{10}$ linear or branched alkyl, and phenyl optionally substituted by $C_1$-$C_{10}$ linear or branched alkyl;
and step (2): reacting the product of step (1) with the compound of formula (IV) to obtain the product of step (2),

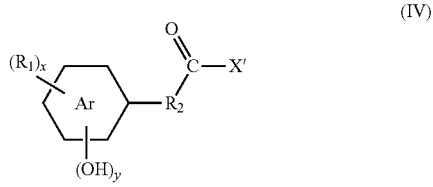

wherein x is 1, 2, or 3, y is an integer between 1 and 5, and the sum of x+y is less than or equal to the number of hydrogen atoms available for subsitution on the Ar group; the plural $R_1$ groups, identical to or different from each other, and are independently selected from H, $C_1$-$C_6$ linear alkyl, and $C_1$-$C_6$ branched alkyl, the Ar group is a benzene ring, the $R_2$ group is a single bond or $C_1$-$C_6$ alkylene, and X' is F, Cl, Br, I or OH.

6. The method according to claim 5, wherein the compound of formula (II) and/or the inorganic acid salt thereof is one or more selected from an amino acid, a condensate of amino acids, an inorganic salt of an amino acid, and an inorganic salt of a condensate of amino acids.

7. The method according to claim 5, wherein the compound of formula (II) and/or the inorganic acid salt thereof is selected from one or more of the following compounds: L-serine, L-serine ester hydrochloride, L-leucine, L-leucine ester hydrochloride, L-isoleucine, L-isoleucine ester hydrochloride, glycine, glycine ester hydrochloride, L-phenylalanine, L-phenylalanine ester hydrochloride, L-valine, and L-valine ester hydrochloride, and
the compound of formula (III) is selected from phosphorous acid, dimethyl phosphite, diethyl phosphite, dipropyl phosphite, diisopropyl phosphite, di-n-butyl phosphite, diisobutyl phosphite, di-tert-butyl phosphite, (2-ethylhexyl) phosphite, dibenzyl phosphite, diphenyl phosphite, thiophosphorous acid, dimethyl thiophosphite, diethyl thiophosphite, dipropyl thiophosphite, diisopropyl thiophosphite, di-n-butyl thiophosphite, diisobutyl thiophosphite, di-tert-butyl thiophosphite, 2-ethylhexyl thiophosphite, dibenzyl thiophosphate, and diphenyl thiophosphite.

8. The method according to claim 5, wherein, in step (1), the reaction molar equivalent ratio of the compound of formula (II) and/or the inorganic acid salt thereof (calculated as XA''') to the compound of formula (III) (calculated as P-H) is 1:5 to 5:1; and the reaction temperature is −40 to 80° C.

9. The method according to claim 5, wherein, in step (1), a solvent is added to the reaction of the compound represented of formula (II) and/or the inorganic acid salt thereof with the compound of formula (III);
a catalyst is optionally added;
a chloride is optionally added;
and optionally the reaction is carried out at pH 8-10.

10. The method according to claim 5, wherein, in step (1), after the reaction of the compound of formula (II) and/or the inorganic acid salt thereof with the compound of formula (III), the reaction product is subject to one or more of extraction treatment, a drying treatment, or an ultrasonic treatment;
wherein the extraction treatment is carried out by a solvent in an acidic environment;
wherein the drying treatment is an ultrasonic treatment in the presence of a solvent for 1-10 hours.

11. The method according to claim 5, wherein, in step (2), the compound of formula (IV) is selected from one or more of the following compounds: 3,5-bis(tert-butyl)-4-hydroxyphenylacetyl chloride, 3,5-bis(tert-butyl)-4-hydroxyphenylpropionyl chloride, p-hydroxyphenylacetyl chloride, 3-hydroxyphenylacetyl chloride, 2-hydroxyphenylacetyl chloride, 3,4-dihydroxyphenylacetyl chloride, 3,5-dihydroxyphenylacetyl chloride, 3-methyl-4-hydroxyphenylacetyl chloride, 3,5-dimethyl-4-hydroxyphenylacetyl chloride, 2,4-dihydroxyphenylpropionyl chloride, and 3,4-dihydroxyphenylpropionyl chloride.

12. The method according to claim 5, wherein, in an optional step (2), the reaction molar equivalent ratio of the compound (calculated as X') of the formula (IV) to the reaction product (calculated as NH) of the step (1) is 5:1-1:5; the reaction temperature is −40 to 60° C.
13. The phosphorus-containing compound according to claim 1, wherein the plural $R_0$ groups, identical to or different from each other, are independently selected from H, $C_1$-$C_4$ linear alkyl, $C_1$-$C_4$ branched alkyl, and
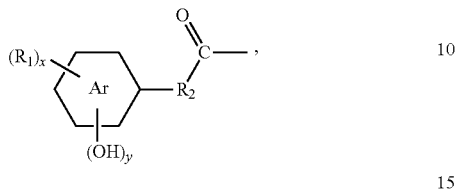
with the proviso that at least one $R_0$ in formula (I) is
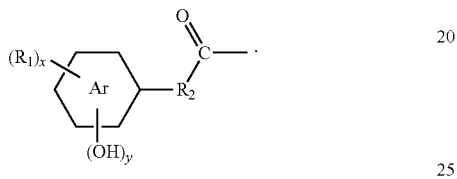
* * * * *